Jan. 1, 1963     I. M. DOCKEN     3,071,468
POULTRY OFFAL CONVERSION PROCESS
Filed Oct. 7, 1960
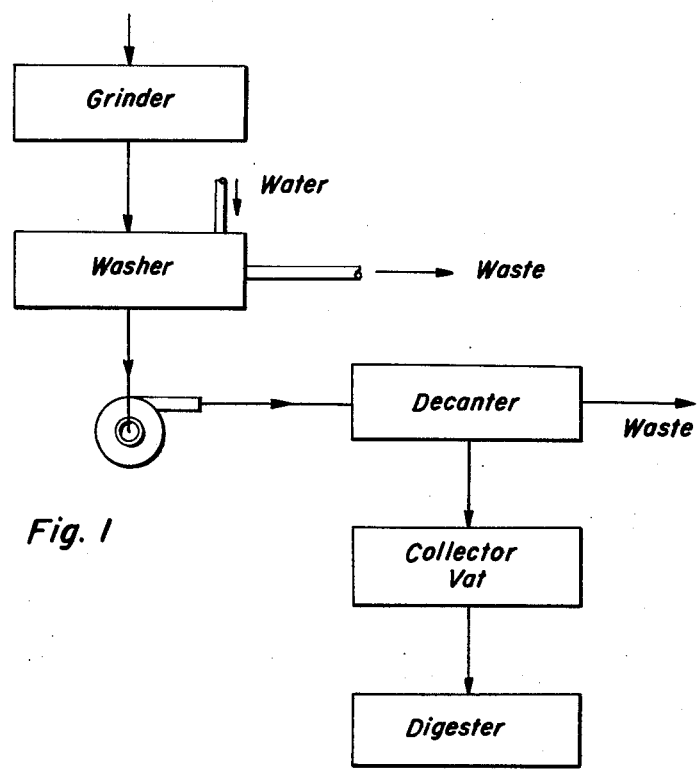
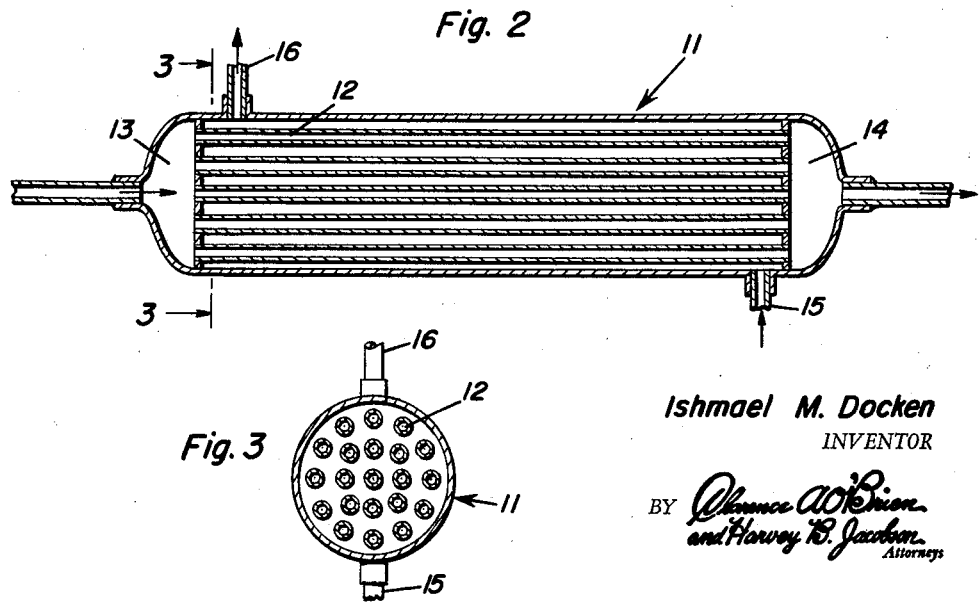
Ishmael M. Docken
INVENTOR

United States Patent Office 3,071,468
Patented Jan. 1, 1963

3,071,468
POULTRY OFFAL CONVERSION PROCESS
Ishmael M. Docken, 7300 SW. Briar Place,
Portland, Oreg.
Filed Oct. 7, 1960, Ser. No. 62,822
3 Claims. (Cl. 99—7)

This invention relates to the treatment of certain proteinaceous materials and in particular to a process of liquefying proteinaceous materials to prepare or recover nutritional food supplements or concentrates therefrom. More particularly, this invention concerns a new and improved process for converting poultry offal (i.e., heads, feet and viscera) into a highly digestible food product. The process is herein illustratively described by reference to its presently preferred practice; however, it will be recognized that certain modifications and changes therein may be made with respect to details without departing from the essential features involved.

This application is a continuation-in-part of patent application Serial No. 845,515, filed October 5, 1959, for Treatment of Proteinaceous Materials, now abandoned.

While poultry offal can be ground and used in "meat meal" as animal food, its protein content is only 40% to 60% assimilable or available. Consequently, its value as food is limited to the extent that the assimilability of the protein is limited to the extent that the assimilability of the protein content is limited. To the best of the present applicant's knowledge and belief, a commercially practicable and satisfactory method of converting poultry offal into foodstuff having protein content in substantially 100% assimilable form has not been known heretofore.

A broad object of this invention is to convert poultry offal into a useful food product having its protein content in substantially 100% available or assimilable form.

A related object of great importance is to provide such a process which is efficient and economical. Specifically it is an object to produce the desired end product without additives and with minimum expenditures of heat, and thereby at minimal cost.

Minimal and readily implemented apparatus requirements are additional objects of the invention. Still another object of the invention is to produce from poultry offal a liquid or creamy foodstuff which can be readily pelletized and can be readily dried and converted into a high-protein flour and an oil, if desired, or can be left in its normal creamy or pasty condition for use in that form as well.

A further object is to develop a process for converting poultry offal into the described end product in a very short period of time.

In accordance with this invention it has been discovered that useful enzymatic action does not end at temperatures slightly above 100° F., the natural body temperature of a chicken, for example, but if the temperature of ground poultry offal is elevated quickly to the range of approximately 136° F. to 140° F., with the optimum point being substantially 139.5° F., a very rapid conversion of the offal into the desired end product herein described takes place. This conversion occurs by selective autolysis as a result of the selective activation of certain natural enzymes in the offal itself and without necessity for additives. It takes place so rapidly that the cost of thermal energy to produce the result is economically acceptable to bulk processing on a commercial basis. It takes place so thoroughly that virtually all of the end product is useful, assimilable, high-protein food. The temperature conditions are critical, inasmuch as a higher temperature results in a putrid, useless product, whereas a temperature materially below 136° F. results in incomplete conversion or in no conversion at all. While conversion does take place to a degree at a temperature of as low as 130° F., for example, the time requirement is so great as compared with the time required at the optimum point of 139.5° F. as to be commercially and economically unacceptable. If the temperature of the ground offal is not elevated quickly to the conversion temperature, other enzymes become active and the end product is correspondingly impaired by destruction of components which otherwise may be converted into assimilable proteinaceous substance.

These and other features, objects and advantages of the invention will become more fully evident from the following description thereof by reference to the accompanying drawings.

FIGURE 1 is a flow sheet disclosing the various steps of the process of the present invention.

FIGURE 2 is a side elevation view of a digester useful in carrying out a step in the process of the present invention.

FIGURE 3 is a cross section taken on line 3—3 of FIGURE 2.

In accordance with this invention the poultry offal is ground or comminuted into hamburger or finer consistency and, after washing, is relieved of excess water and free grease, as by decanting. Thereupon the material is heated quickly to a temperature in the range between 136° F. and 140° F. The optimum temperature is 139.5° F., at which the conversion takes place most rapidly and with least expenditure of thermal energy. Depending upon the rapidity with which the ground offal is heated to the conversion temperature, conversion may occur in less than a minute. Methods, such as dielectric heating or passage of the ground offal in a very thin layer over heated conductive surfaces, can yield the desired result in a period of this order of magnitude. When conversion is accomplished in a vat-type digester, the process, of course, takes longer because a longer time is required to heat the offal uniformly to the required conversion temperature without overheating offal in contact with the heating surfaces. Avoidance of overheating is, of course, very important because of the degeneration which takes place, producing a putrid end product having no useful known application, when the temperature exceeds 140°. Somewhat similar undesired action occurs if the temperature is not raised with sufficient rapidity, apparently because of the activity of other natural enzymes and bacteria in the offal. Another reason for the importance of raising the offal to conversion temperature rapidly as possible is that of thermal efficiency. Unless the applied heat is being used to convert the offal into the desired end product, such heat is wasted. To the extent that heat is being applied while the offal is outside the critical range, therefore, as during an unduly prolonged period of heating up the offal to the critical rapid-conversion range, thermal efficiency is correspondingly reduced.

With the offal maintained within the critical heating temperature range mentioned, certain natural enzymes in the offal become highly active and convert the hamburger-like substance almost immediately into a creamy gray paste or thick liquid of homogeneous characteristics. The pH value of the substance remains substantially neutral throughout the process. No additives are needed or desirable. The liquefied product thus formed is very rich in assimilable protein value. It also contains calciferous elements, of course, due to the calcium content of the bones, but these need not be separated out for most applications since they also have dietary value. The offal also contains oils, and these oils may be separated out by a drying process in which the end products are the oils mentioned and a flour-like substance having acceptable keeping qualities for most applications.

After the conversion has occurred, it may be desirable to pasteurize the end product for a limited period to be certain that all harmful bacteria and virus have been destroyed. To do this, the product is held in heated vats (not shown) for a period, preferably between 20 and 30 minutes. Credit against the required pasteurization period may be taken for the period at which the material had been held at the conversion temperature of between 136° F. and 140° F. during the conversion process.

Referring to FIGURE 1, in the illustrated practical application of the process of the present invention, the offal material is fed into a grinding machine. Several different commercially available grinding machines are applicable. For instance, a hog grinding machine has been found particularly useful. This type of machine is used for grinding shop fats, bones and animal carcasses into a fine uniform product. It has a vertical feed and a bottom discharge duct. A plurality of knives are fastened to the face of a rotatably mounted cylinder in the grinder. The rotating knives are in cooperating relationship with two stationary knives to effect a shearing action. The product is cut and recut before being discharged at the bottom through the discharge spout. This type of grinder is manufactured in various sizes so that a variety of throughput rates may be achieved.

The ground material discharged from the grinder is then fed into a washer. The washer which has been found useful is a screened drum revolving through a water bath.

From the washer the cleaned ground offal material is pumped into a decanter in order to adjust the water content. The decanter preferred in the practice of the process is known as a horizontal bowl decanter. This type of decanter has a horizontal bowl which rotates at high speed thereby creating a high centrifugal force which acts in a direction vertical to the axis of rotation to perform rapid and efficient sedimentation of the solids suspended in the liquid. The slurry of offal from the washer is introduced into the bowl through a feed tube in the hollow center shaft. It is then led into the separating area where the high centrifugal force deposits the solids against the wall of the bowl. The liquid, being of lower specific gravity, forms a concentric inner layer in the bowl. Inside the rotating bowl is a helical screw conveyor which rotates in the same direction as the bowl but at a slightly lower speed. The flights are designed so that the offal solids which are thrown to the bowl wall are conveyed to one end of the bowl where they are discharged through suitably located openings. The clarified liquid continuously overflows weirs at the opposite end of the bowl. A discharge opening leads the liquid away and keeps it separate from the solids. The decanter, then, will bring the product to the desired water content and eliminates free grease, thus ensuring an end product having uniform moisture, fat and protein content.

From the decanter the material is fed into a vat. The vat is employed to store the offal until it may be admitted into the next step which is a digester. A pump is employed to move the material to the digester.

For an understanding of the illustrative type of digester, attention is directed to FIGURES 2 and 3. The digester comprises a large tube or housing 11 through which extend a plurality of smaller conduits 12. Headers 13 and 14 are associated with each end of the smaller conduits. The housing 11 contains a fluid heating medium which surrounds the small conduits. Suitable ingress ports 15 and egress ports 16 are provided in order to effect suitable circulation. The conduits leading therefrom are led to a conventional heat source or heat exchanger. The heating medium must not raise the digester temperature above 140° F., but should maintain it at between 136° F. and 139° F., preferably as near the latter figure as possible.

It has been discovered that when the chicken offal is pumped through the digester at the controlled temperature mentioned, the offal reacts autolytically due to the natural enzymes present in the material and becomes a liquefied chicken material, comprising substantially 100% assimilable protein and of a homogeneous consistency, having the appearance of thick cream. The material is pumped from the vat through the digester and is allowed to circulate from the vat through the digester until the required amount of digestion or chemical process has taken place.

While, in the above, a specific example of a heat exchanger digester has been disclosed, other heat exchangers and heating techniques may also be employed. A container which would stir the materials and at the same time assure a uniform heating at approximately 139.5° F. could be employed. In such an instance, paddle wheels could be the means for agitating the offal and heating means, therein, could maintain the required temperature. However, the digester described in the above has been found to be the most efficient.

As a result of the process a chicken offal product is obtained which is a liquid chicken material, high in available, assimilable protein, having controlled moisture and grease or fat content, and is suitable in the manufacture of pet, animal and fish foods. The product would also be useful in making food products for human consumption. Another feature is the fact that the end product lends itself to easy pelletization.

Inasmuch as the body temperature of a chicken is below 100° F., it is considered remarkable and unexpected that natural enzymes present in the ground offal are so highly and selectively activatable as to produce substantially 100% useful food product in such a short period at the elevated temperatures specified, particularly at 139.5° F., the optimum temperature. As previously mentioned, it is understood that others had previously considered that useful natural enzyme activity virtually ceased at 120° F., or thereabouts, and it was not conceived or appreciated heretofore that the results of this process were attainable, especially so on a commercially feasible and economical basis as described.

It will be apparent that many changes and modifications of the several features of the process described herein may be made without departing from the spirit and scope of the invention. It is, therefore, to be understood that the foregoing description is by way of illustration of the invention rather than limitation upon the invention.

I claim as my invention:

1. The method of producing foodstuff high in readily assimilable protein from ground poultry offal, which comprises inducing autolytic action therein selectively by that group of natural enzymes therein which become active at a temperature within the range between 130° F. and 140° F., such autolytic action being effected by maintaining the temperature of the offal within the range between approximately 136° F. and 140° F. for a time period in which such offal is substantially converted into said foodstuff.

2. The method of producing foodstuff high in readily assimilable protein from ground poultry offal, which comprises inducing autolytic action therein selectively by that group of natural enzymes therein which become active at a temperature below 140° F. and above 130° F., by maintaining the temperature of such offal at approximately 139.5° F. for a time period permitting such autolytic action to occur.

3. In a process of converting ground poultry offal into foodstuff high in assimilable protein content, the step of heating the offal at a temperature of substantially 139.5° F. for a period sufficient to permit autolytic conversion thereof into a substantially homogeneous substance.

References Cited in the file of this patent

UNITED STATES PATENTS

| | | |
|---|---|---|
| 1,561,667 | Schmelzer | Nov. 17, 1925 |
| 2,622,029 | Torr | Dec. 16, 1952 |
| 2,975,055 | Brown et al. | Mar. 14, 1961 |

FOREIGN PATENTS

| | | |
|---|---|---|
| 378,399 | Great Britain | July 25, 1932 |